(12) United States Patent
Guo et al.

(10) Patent No.: US 11,031,871 B2
(45) Date of Patent: Jun. 8, 2021

(54) LLC RESONANT CONVERTER SYSTEM

(71) Applicant: DELTA ELECTRONICS, INC., Taoyuan (TW)

(72) Inventors: Xingkuan Guo, Taoyuan (TW); Xinwei Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/716,437

(22) Filed: Dec. 16, 2019

(65) Prior Publication Data
US 2020/0204079 A1 Jun. 25, 2020

(30) Foreign Application Priority Data
Dec. 19, 2018 (CN) .......................... 201811553813.8

(51) Int. Cl.
*H02M 3/335* (2006.01)
*H02M 3/28* (2006.01)
*H02M 1/00* (2006.01)

(52) U.S. Cl.
CPC ........... *H02M 3/335* (2013.01); *H02M 3/285* (2013.01); *H02M 3/33538* (2013.01);
(Continued)

(58) Field of Classification Search
CPC ........... H02M 3/3353; H02M 3/33538; H02M 3/33569; H02M 3/285; H02M 2001/0058; H02M 2001/0077; H02M 3/335
See application file for complete search history.

(56) References Cited

U.S. PATENT DOCUMENTS

| 2008/0190906 A1* | 8/2008 | Aigner | H02M 3/335 219/130.21 |
|---|---|---|---|
| 2009/0079402 A1 | 3/2009 | Nakahori | |
| 2016/0254756 A1* | 9/2016 | Yang | H01F 30/12 363/21.02 |

FOREIGN PATENT DOCUMENTS

| CN | 101238632 A | 8/2008 |
|---|---|---|
| CN | 101562399 A | 10/2009 |

(Continued)

OTHER PUBLICATIONS

Corresponding extended European search report dated Jun. 3, 2020.
(Continued)

*Primary Examiner* — Jue Zhang
(74) *Attorney, Agent, or Firm* — CKC & Partners Co., LLC

(57) ABSTRACT

Embodiments of the present disclosure provide an LLC resonant converter system. The LLC resonant converter system includes: a first resonant circuit including a first switch circuit, a first LC resonant circuit, a first transformer, and a first rectifier circuit; and a second resonant circuit including a second switch circuit, a second LC resonant circuit, a second transformer, and a second rectifier circuit; where one secondary side winding of the first transformer is connected in series with one secondary side winding of the second transformer to form a first series branch, and the other secondary side winding of the first transformer is connected in series with the other secondary side winding of the second transformer to form a second series branch. The LLC resonant converter system achieves current equilibrium or voltage equilibrium in a two-branch resonant circuit, thereby simplifying a control circuit and improving current equilibrium or voltage equilibrium effects.

11 Claims, 5 Drawing Sheets

(52) U.S. Cl.
CPC .............. *H02M 3/33569* (2013.01); *H02M 2001/0058* (2013.01); *H02M 2001/0077* (2013.01)

(56) References Cited

FOREIGN PATENT DOCUMENTS

| | | | |
|---|---|---|---|
| CN | 207426981 U | | 5/2018 |
| CN | 108768177 A | * | 11/2018 |
| CN | 108768177 A | | 11/2018 |
| DE | 102005036806 A1 | | 2/2007 |

OTHER PUBLICATIONS

Ziwei Ouyang et al., "Wide Input Range Power Converters Using a Variable Turns Ratio Transformer," 2016 IEEE Applied Power Electronics Conference and Exposition (APEC), May 12, 2016, pp. 2473-2478.
Corresponding China office action dated Oct. 23, 2020.

* cited by examiner

LLC RESONANT CONVERTER SYSTEM

CROSS-REFERENCE TO RELATED APPLICATION

The present application claims priorities to Chinese Patent Application No. 201811553813.8, filed on Dec. 19, 2018, entitled "LLC RESONANT CONVERTER SYSTEM", the disclosure of which is hereby incorporated by reference in its entirety.

TECHNICAL FIELD

Embodiments of the present disclosure relate to the field of power electronics and, in particular, to an LLC resonant converter system.

BACKGROUND

An LLC (abbreviation of Lr, Lm, and Cr, where Lr refers to a resonant inductor, Lm refers to a magnetic inductor, Cr refers to a resonant capacitor) resonant converter has an advantage such as a high switching frequency, a low turn-off loss, a high conversion efficiency, a low electromagnetic interference noise, and a small switching stress, which thus has been widely used. However, an LLC resonant circuit has limited output power and is generally suitable for use in low- and medium-power products. A two-branch LLC resonant circuit may be used to obtain higher output power. For example, both inputs and outputs of the two-branch LLC resonant circuit may be connected in parallel respectively, or the inputs of the two-branch LLC resonant circuit may be connected in parallel while the outputs may be connected in series, then switch transistors in the two-branch LLC resonant circuit are controlled at the same switching frequency, and thus it is possible to attain an objective such as a low switching loss, a high conversion efficiency and a high output power.

However, when both the inputs and the outputs of the two-branch LLC resonant circuit are connected in parallel respectively, and the switch transistors in the two-branch LLC resonant circuit are controlled at the same switching frequency, output currents of the two-branch LLC resonant circuit may be unbalanced due to inconsistent resonant parameters of the two-branch LLC resonant circuit, so that the output current of one LLC resonant circuit is greater than the output current of the other LLC resonant circuit. Such unbalance of the output currents makes output power of an LLC resonant circuit that has a larger output current exceed its rated power at full load, causing damage to a component in the LLC resonant circuit. Similarly, when the inputs of the two-branch LLC resonant circuit are connected in parallel and the outputs are connected in series, and the switch transistors in the two-branch LLC resonant circuit are controlled at the same switching frequency, output voltages of the two-branch LLC resonant circuit may be unbalanced due to inconsistent resonant parameters of the two-branch LLC resonant circuit, so that the output voltage of one LLC resonant circuit is greater than the output voltage of the other LLC resonant circuit. Such unbalance of the output voltages makes output power of an LLC resonant circuit that has a larger output voltage exceed its rated power at full load, causing damage to a component in the LLC resonant circuit.

In order to solve the problem of current or voltage unbalance of the above two-branch LLC resonant circuit, in the prior art, two independent switching frequencies are generally used to respectively control the two-branch LLC resonant circuit, which not only increases complexity of the LLC resonant converter control circuit, but also results in poor current equilibrium or voltage equilibrium effects for the two-branch LLC resonant circuit.

SUMMARY

Embodiments of the present disclosure provide an LLC resonant converter system, which is used to solve the problem in the prior art that a control circuit is complex and current equilibrium or voltage equilibrium effects are poor due to the use of two independent switching frequencies at which a two-branch LLC resonant circuit is controlled respectively.

In a first aspect, an embodiment of the present disclosure provides a resonant converter system, including:

a first resonant circuit including a first switch circuit, a first LC resonant circuit, a first transformer, and a first rectifier circuit, and a second resonant circuit including a second switch circuit, a second LC resonant circuit, a second transformer, and a second rectifier circuit, where the first transformer includes one primary side winding and two secondary side windings, the second transformer includes one primary side winding and two secondary side windings, the primary side windings of the first transformer and the second transformer have the same number of turns, and all the secondary side windings in the first transformer and the second transformer have the same number of turns;

where a first end of the first switch circuit is connected to one end of the first LC resonant circuit, the other end of the first LC resonant circuit is connected to one end of the primary side winding of the first transformer, the other end of the primary side winding of the first transformer is connected to a second end of the first switch circuit, and one secondary side winding of the first transformer is connected in series with one secondary side winding of the second transformer to form a first series branch, a first end and a second end of the first series branch are respectively connected to a first input and a second input of the first rectifier circuit;

where a first end of the second switch circuit is connected to one end of the second LC resonant circuit, the other end of the second LC resonant circuit is connected to one end of the primary side winding of the second transformer, the other end of the primary side winding of the second transformer is connected to a second end of the second switch circuit, and the other secondary side winding of the first transformer is connected in series with the other secondary side winding of the second transformer to form a second series branch, a first end and a second end of the second series branch are respectively connected to a first input and a second input of the second rectifier circuit.

In a second aspect, an embodiment of the present disclosure provides a two-branch three-phase resonant converter system, including:

a first resonant circuit including a first three-phase switch circuit, a first LC resonant circuit, a first transformer circuit, and a first three-phase rectifier circuit; and a second resonant circuit including a second three-phase switch circuit, a second LC resonant circuit, a second transformer circuit, and a second three-phase rectifier circuit;

where the first transformer circuit includes a first transformer having one primary side winding and two secondary side windings, a second transformer having one primary side winding and two secondary side windings, and a third transformer having one primary side winding and two secondary side windings; where the second transformer circuit includes a fourth transformer having one primary side winding and two secondary side windings, a fifth transformer having one primary side winding and two secondary side windings, and a sixth transformer having one primary side winding and two secondary side windings, both the primary side windings in the first transformer circuit and the second transformer circuit have the same number of turns, and all the secondary side windings in the first transformer circuit and the second transformer circuit have the same number of turns;

where a first input of the first LC resonant circuit is connected to a first output of the first three-phase switch circuit, a second input of the first LC resonant circuit is connected to a second output of the first three-phase switch circuit, and a third input of the first LC resonant circuit is connected to a third output of the first three-phase switch circuit; a first output, a second output, and a third output of the first LC resonant circuit are respectively connected to one end of the primary side winding of the first transformer, one end of the primary side winding of the second transformer, and one end of the primary side winding of the third transformer; the other end of the primary side winding of the first transformer, the other end of the primary side winding of the second transformer, and the other end of the primary side winding of the third transformer are connected; one secondary side winding of the first transformer and one secondary side winding of the fourth transformer are connected in series between a first input of the first three-phase rectifier circuit and a first common end, one secondary side winding of the second transformer and one secondary side winding of the fifth transformer are connected in series between a second input of the first three-phase rectifier circuit and the first common end, and one secondary side winding of the third transformer and one secondary side winding of the sixth transformer are connected in series between a third input of the first three-phase rectifier circuit and the first common end;

where a first input of the second LC resonant circuit is connected to a first output of the second three-phase switch circuit, a second input of the second LC resonant circuit is connected to a second output of the second three-phase switch circuit, and a third input of the second LC resonant circuit is connected to a third output of the second three-phase switch circuit; a first output, a second output, and a third output of the second LC resonant circuit are respectively connected to one end of the primary side winding of the fourth transformer, one end of the primary side winding of the fifth transformer, and one end of the primary side winding of the sixth transformer; the other end of the primary side winding of the fourth transformer, the other end of the primary side winding of the fifth transformer, and the other end of the primary side winding of the sixth transformer are connected; the other secondary side winding of the first transformer and the other secondary side winding of the fourth transformer are connected in series between a first input of the second three-phase rectifier circuit and a second common end, the other secondary side winding of the second transformer and the other secondary side winding of the fifth transformer are connected in series between a second input of the second three-phase rectifier circuit and the second common end, and the other secondary side winding of the third transformer and the other secondary side winding of the sixth transformer are connected in series between a third input of the second three-phase rectifier circuit and the second common end.

BRIEF DESCRIPTION OF DRAWINGS

Accompanying drawings herein are incorporated into the specification and form a part of the specification, which show embodiments that is consistent with the present disclosure and are used in conjunction with the description to explain principles of the present disclosure.

Specific embodiments of the present disclosure have been illustrated with the foregoing drawings and will be described in detail below. The drawings and the textual description are not intended to limit the scope of the present disclosure in any way, but to explain concepts of the present disclosure for persons skilled in the art with reference to the specific embodiments.

DESCRIPTION OF EMBODIMENTS

Exemplary embodiments will be described in detail herein, examples of which are illustrated in the accompanying drawings. When the following description relates to the accompanying drawings, the same number in different drawings represents the same or similar elements unless otherwise indicated. Implementations described in the following exemplary embodiments do not represent all implementations consistent with the present disclosure. Instead, they are merely examples of apparatuses and methods that are consistent with aspects of the present disclosure as detailed in the appended claims.

Terms such as "include" and "have" and any variation thereof in the specification and claims of the present disclosure are intended to cover a non-exclusive inclusion, e.g., processes, methods, systems, products or devices that encompass a series of steps or units are not necessarily limited to those steps or units that have been listed, but may alternatively include steps or units that are not listed or may alternatively include other steps or units inherent to these processes, methods, products or devices.

Terms such as "first" and "second" in the present disclosure only function as identifiers, which cannot be construed as indicating or implying a sequential relationship or relative importance or implicitly indicating the number of technical features indicated. The meaning with regard to "a plurality of" indicates two or more. The term such as "and/or" is intended to describe an association between associated objects, which indicates that there may be three relationships, for example, A and/or B may indicate presence of A only, of both A and B, and of B only. The character "/" generally indicates that contextual objects have an "or" relationship.

An expression such as "one embodiment" or "an embodiment" throughout the specification of the present disclosure means that a particular feature, structure or characteristic related to the embodiment is included in at least one embodiment of the present application. Therefore, an expression such as "in one embodiment" or "in an embodiment" throughout the whole specification is not necessarily directed to the same embodiment or example. It should be noted that embodiments in the present disclosure and features in the embodiments may be combined with each other without conflict.

Figure 1:
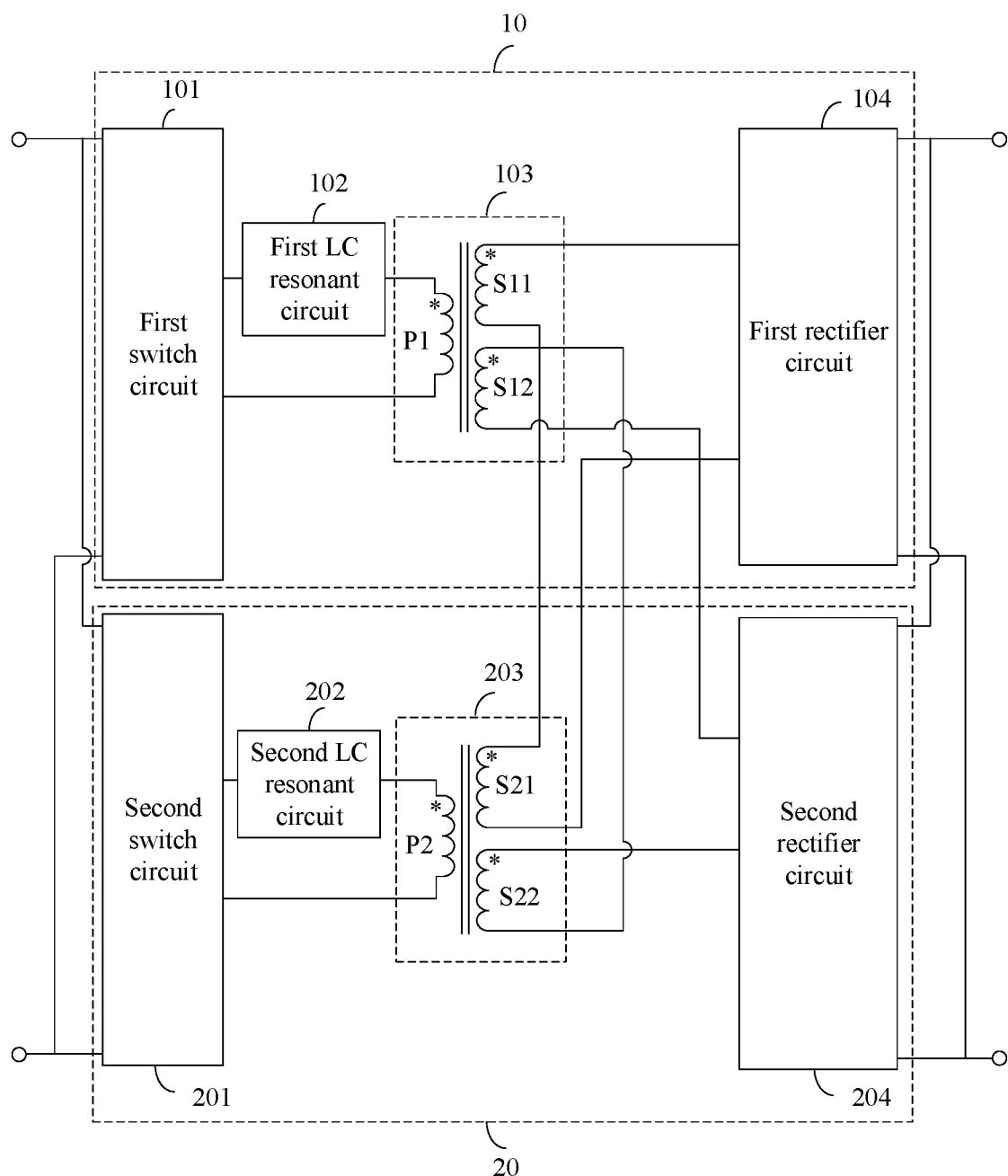
FIG. 1 is a schematic structural diagram of an embodiment of an LLC resonant converter system according to the present disclosure.

FIG. 1 is a schematic structural diagram of an embodiment of an LLC resonant converter system according to the present disclosure. As shown in FIG. 1, the LLC resonant converter system provided in the present disclosure may include:

a first resonant circuit 10 and a second resonant circuit 20.

The first resonant circuit 10 includes a first switch circuit 101, a first LC resonant circuit 102, a first transformer 103, and a first rectifier circuit 104 that are sequentially connected.

The second resonant circuit 20 includes a second switch circuit 201, a second LC resonant circuit 202, a second transformer 203, and a second rectifier circuit 204 that are sequentially connected.

The first transformer 103 includes one primary side winding P1 and two secondary side windings S11 and S12, the second transformer 203 includes one primary side winding P2 and two secondary side windings S21 and S22, both the primary side windings in the first transformer 103 and the second transformer 203 have the same number of turns, and all the secondary side windings in the first transformer 103 and the second transformer 203 have the same number of turns.

A first end of the first switch circuit 101 is connected to one end of the first LC resonant circuit 102, the other end of the first LC resonant circuit 102 is connected to one end of the primary side winding P1 of the first transformer 103, the other end of the primary side winding P1 of the first transformer 103 is connected to a second end of the first switch circuit 101, and one secondary side winding S11 of the first transformer 103 is connected in series with one secondary side winding S21 of the second transformer 203 to form a first series branch, a first end and a second end of the first series branch are respectively connected to a first input and a second input of the first rectifier circuit 104. Where, the first resonant circuit 10 is an LLC resonant circuit, and an inductor L1, a capacitor C1 in the first LC resonant circuit 102 and a magnetic inductor of the first transformer 103 constitute an LLC resonance.

A first end of the second switch circuit 201 is connected to one end of the second LC resonant circuit 202, the other end of the second LC resonant circuit 202 is connected to one end of the primary side winding P2 of the second transformer 203, the other end of the primary side winding P2 of the second transformer 203 is connected to a second end of the second switch circuit 201, and the other secondary side winding S12 of the first transformer 103 is connected in series with the other secondary side winding S22 of the second transformer 203 to form a second series branch, a first end and a second end of the second series branch are respectively connected to a first input and a second input of the second rectifier circuit 204. Where, the second resonant circuit 20 is an LLC resonant circuit, and an inductor L2, a capacitor C2 in the second LC resonant circuit 202 and a magnetic inductor of the second transformer 203 constitute an LLC resonance.

In an embodiment, an output of the first rectifier circuit 104 may be connected in parallel (as shown in FIG. 1) with an output of the second rectifier circuit 204 for providing a high current.

In an embodiment, an output of the first rectifier circuit 104 may be connected in series (not shown in the drawing) with an output of the second rectifier circuit 204 for providing a high voltage.

In an embodiment, an input of the first switch circuit 101 may be connected in parallel (as shown in FIG. 1) with an input of the second switch circuit 201.

In an embodiment, each of the first rectifier circuit 104 and the second rectifier circuit 204 may be a full bridge circuit.

In an embodiment, each of the first switch circuit 101 and the second switch circuit 201 may be a full bridge circuit or a half bridge circuit.

In an embodiment, the first switch circuit 101 and the second switch circuit 201 may operate synchronously.

In an embodiment, the first switch circuit 101 and the second switch circuit 201 each may include a controllable switch.

In an embodiment, each of the first LC resonant circuit and the second LC resonant circuit comprises a capacitor and an inductor in serial.

In this embodiment, the primary side winding P1 of the first transformer 103 and the primary side winding P2 of the second transformer 203 have the same number of turns, and the two secondary side windings S11 and S12 of the first transformer 103 and the two secondary side windings S21 and S22 of the second transformer 203 have the same number of turns. It is assumed that a ratio of the number of turns of the primary side winding and the number of turns of the two secondary side windings in respective the first transformer 103 and the second transformer 203 is 1:N:N, where N is a positive number. Asterisks in the drawing indicate dotted terminals of a transformer and, for secondary side windings of the transformer, voltage thereon are marked using the dotted terminals as the positive direction, that is, when they operate, the voltage across the secondary side windings of the transformer in the first series branch and the voltage across the secondary side windings of the transformer in the second series branch have the same phase, where the secondary side windings of the transformer in the first series branch and the secondary side windings of the transformer in the second series branch are connected in series.

Description is made by taking an example where an output of the first rectifier circuit 104 is connected in parallel with an output of the second rectifier circuit 204 for providing a high current, which is shown in FIG. 1, the principle of the current equilibrium of the LLC resonant converter system provided in this embodiment lies in that: the currents through S11 and S21 are the same, the currents through S12 and S22 are the same, then the currents reflected from the secondary side windings to the primary side windings are also eventually equal. Details are as follows:

a branch current of the primary side winding P1 of the first transformer 103 is marked as $I_1$, a branch current of the secondary side winding S11 of the first transformer 103 is marked as $I_{11}$ and a branch current of the secondary side winding S12 of the first transformer 103 is marked as $I_{12}$; a branch current of the primary side winding P2 of the second transformer 203 is marked as $I_2$, a branch current of the secondary side winding S21 of the second transformer 203 is marked as $I_{21}$, and a branch current of the secondary side winding S22 of the second transformer 203 is marked as $I_{22}$.

Since the secondary side winding S11 and the secondary side winding S21 are connected in series, $I_{11}=I_{21}$, marked as $I_{S1}$; since the secondary side winding S12 and the secondary side winding S22 are connected in series, $I_{12}=I_{22}$, marked as $I_{S2}$. Since a ratio of the number of turns of the primary side winding and the number of turns of the two secondary side windings of each transformer is 1:N:N, then $I_1=N*I_{11}+N*I_{12}$ and $I_2=N*I_{21}+N*I_{22}$. Since $I_{11}=I_{21}$ and $I_{12}=I_{22}$, $I_1=N*I_{11}+N*I_{12}=N*I_{21}+N*I_{22}=I_2$.

Magnitudes of $I_{S1}$ and $I_{S2}$ are determined according to circuit impedance at sides of the secondary side windings, that is, circuit impedance of the first rectifier circuit 104 and the second rectifier circuit 204. If both of them have the same circuit impedance, then $I_{S1}$ and $I_{S2}$ are the same in magnitude, that is, $I_{S1}=I_{S2}$, marked as $I_S$, then $I_1=I_2=N*I_{S1}+N*I_{S2}=2N*I_S$; if both of them do not have the same circuit impedance, then $I_{S1}$ and $I_{S2}$ are not the same in magnitude, then $I_1=I_2=N*I_{S1}+N*I_{S2}$. In summary, it can be seen that current equilibrium between the branch current $I_1$ of the primary side winding of the first resonant circuit 10 and the branch current $I_2$ of the primary side winding of the second resonant circuit 20 can be achieved regardless of whether the secondary side windings have the same circuit impedance.

Similarly, if in a case where an output of the first rectifier circuit 104 is connected in series with an output of the second rectifier circuit 204 for providing a high voltage, the principle of the voltage equilibrium of the LLC resonant converter system provided in this embodiment lies in that:

a voltage at both ends of the primary side winding P1 of the first transformer 103 is marked as $V_{P1}$, a voltage at both ends of the secondary side winding S11 of the first transformer 103 is marked as $V_{11}$, and a voltage at both ends of the secondary side winding S12 of the first transformer 103 is marked as $V_{12}$; a voltage at both ends of the primary side winding P2 of the second transformer 203 is marked as $V_{P2}$, a voltage at both ends of the secondary side winding S21 of the second transformer 203 is marked as $V_{21}$, and a voltage at both ends of the secondary side winding S22 of the second transformer 203 is marked as $V_{22}$; an output voltage of the first rectifier circuit 104 is $V_1$, and an output voltage of the second rectifier circuit 204 is $V_2$.

$V_{11}=V_{12}=N*V_{P1}$, $V_{21}=V_{22}=N*V_{P2}$, $V_1=V_{11}+V_{21}$, and $V_2=V_{12}+V_{22}$, thus $V_1=V_{11}+V_{21}=V_{12}+V_{22}=V_2$. In summary, it can be seen that the output voltage of the first rectifier circuit 104 is equal to the output voltage of the second rectifier circuit 204 regardless of whether the primary side winding has the same voltage at both ends, thus achieving voltage equilibrium in the two-branch circuit.

According to the LLC resonant converter system provided in the present embodiment, by connecting secondary side windings of transformers in a two-branch resonant circuit in series, when an output of a first rectifier circuit is connected in parallel with an output of a second rectifier circuit, current equilibrium in a two-branch circuit is achieved; when the output of the first rectifier circuit is connected in series with the output of the second rectifier circuit, voltage equilibrium in the two-branch circuit is achieved. The LLC resonant converter system provided in the present embodiment may achieve current equilibrium or voltage equilibrium regardless of whether resonant parameters of the two-branch resonant circuit are consistent, thereby expanding a selection range of components and reducing costs; the same control signal may be used to control controllable switches of the two-branch resonant circuit, which reduces complexity of a control circuit and improves current equilibrium or voltage equilibrium effects.

In an embodiment, the first LC resonant circuit 102 and the second LC resonant circuit 202 may each include an inductor and a capacitor connected in series.

In an embodiment, the first switch circuit 101 and the second switch circuit 201 may use a half bridge structure.

In an embodiment, the first rectifier circuit 104 and the second rectifier circuit 204 may be implemented by using a full bridge circuit composed of diodes.

Figure 2:
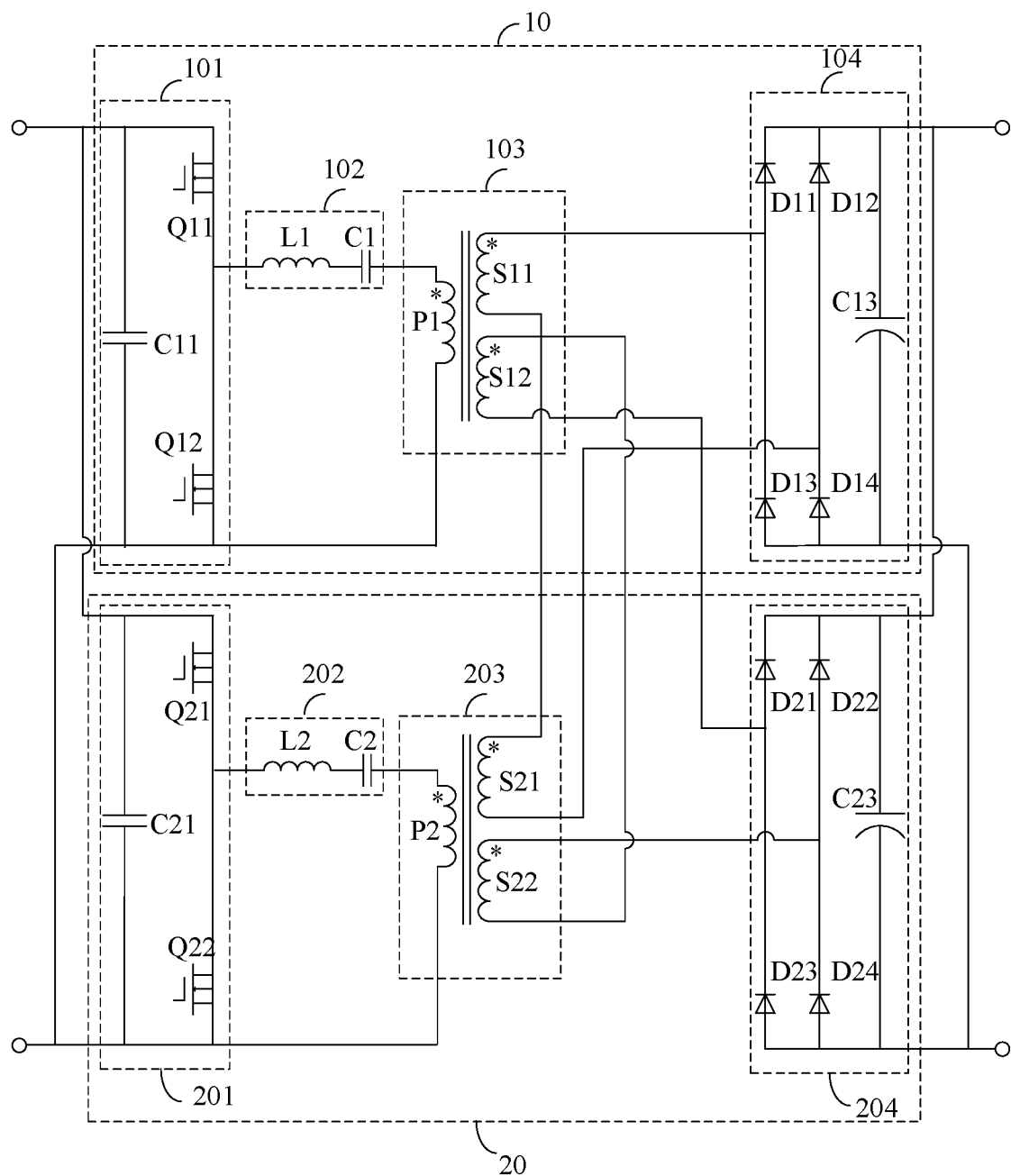
FIG. 2 is a schematic structural diagram of a further embodiment of a LLC resonant converter system according to the present disclosure.

Based on the above embodiment, the present embodiment is combined with the above embodiment to provide a specific embodiment. FIG. 2 is a schematic structural diagram of a further embodiment of a LLC resonant converter system according to the present disclosure. As shown in FIG. 2, a switch circuit in this embodiment uses a half bridge structure, a rectifier circuit is implemented by using a full bridge circuit composed of diodes, and an output of the first rectifier circuit 104 is connected in parallel with an output of the second rectifier circuit 204.

The first switch circuit 101 includes a first capacitor C11, a first switch transistor Q11, and a second switch transistor Q12, where the first capacitor C11 may be a single capacitor, or a capacitor set formed by connecting a plurality of capacitors in series; the first switch transistor Q11 and the second switch transistor Q12 may be a single controllable switch, or a controllable switch set formed by connecting a plurality of controllable switches in series. In this embodiment, the switch transistors Q11 and Q12 are connected in series, where a connection point between the switch transistors Q11 and Q12 is a first end of the first switch circuit 101, one end of the capacitor C11 is connected to one end of the switch transistor Q11, and the other end of the capacitor C11 is connected to one end of the switch transistor Q12 and functions as a second end of the first switch circuit 101. The first LC resonant circuit 102 includes a first inductor L1 and a third capacitor C1 connected in series. The first rectifier circuit 104 includes a first diode D11, a second diode D12, a third diode D13, a fourth diode D14, and a fourth capacitor C13, where D11 and D13 are connected in series, and a connection point between D11 and D13 is a first input of the first rectifier circuit 104; D12 and D14 are connected in series, and a connection point between D12 and D14 is a second input of the first rectifier circuit 104.

It should be noted that the second switch circuit 201, the second LC resonant circuit 202, and the second rectifier circuit 204 have the same circuit topology as the first switch circuit 101, the first LC resonant circuit 102, and the first rectifier circuit 104, respectively. Reference may be made to FIG. 2, and details will not be described herein again.

In other embodiments, the first switch circuit uses a full bridge structure. The full bridge structure includes a first bridge arm and a second bridge arm, where the first bridge arm and the second bridge arm each include an upper switch transistor and a lower switch transistor. The first bridge arm and the second bridge arm are connected in parallel. A connection point at which the upper switch transistor and the lower switch transistor of the first bridge arm are connected in series is the first end of the first switch circuit, and a connection point at which the upper switch transistor and the lower switch transistor of the second bridge arm are connected in series is the second end of the first switch circuit.

It should be noted that the second switch circuit uses a full bridge structure, and its structure is the same as that of the first switch circuit, and details will not be described herein again.

In FIG. 2, asterisks are marked at upper ends of the secondary side windings S11, S12, S21, and S22 of the transformers 103 and 104, and thus the upper ends of the secondary side windings S11, S12, S21, and S22 are dotted terminals. In this embodiment, the switch transistors Q11 and Q21 have the same driving signal, and the switch transistors Q12 and Q22 have the same driving signal.

In other embodiments, asterisks are marked at upper ends of the secondary side windings S11 and S12 of the transformers 103 and 104 and lower ends of the secondary side windings S21 and S22 of the transformer 103 and 104, and thus the upper ends of the secondary side windings S11 and S12 and the lower ends of the secondary side windings S21 and S22 are dotted terminals. In the embodiment, a phase difference between a drive signal of the switch transistor Q11 and a drive signal of the switch transistor Q21 is 180°, and a phase difference between a drive signal of the switch transistor Q12 and a drive signal of the switch transistor Q22 is 180°.

Figure 3:
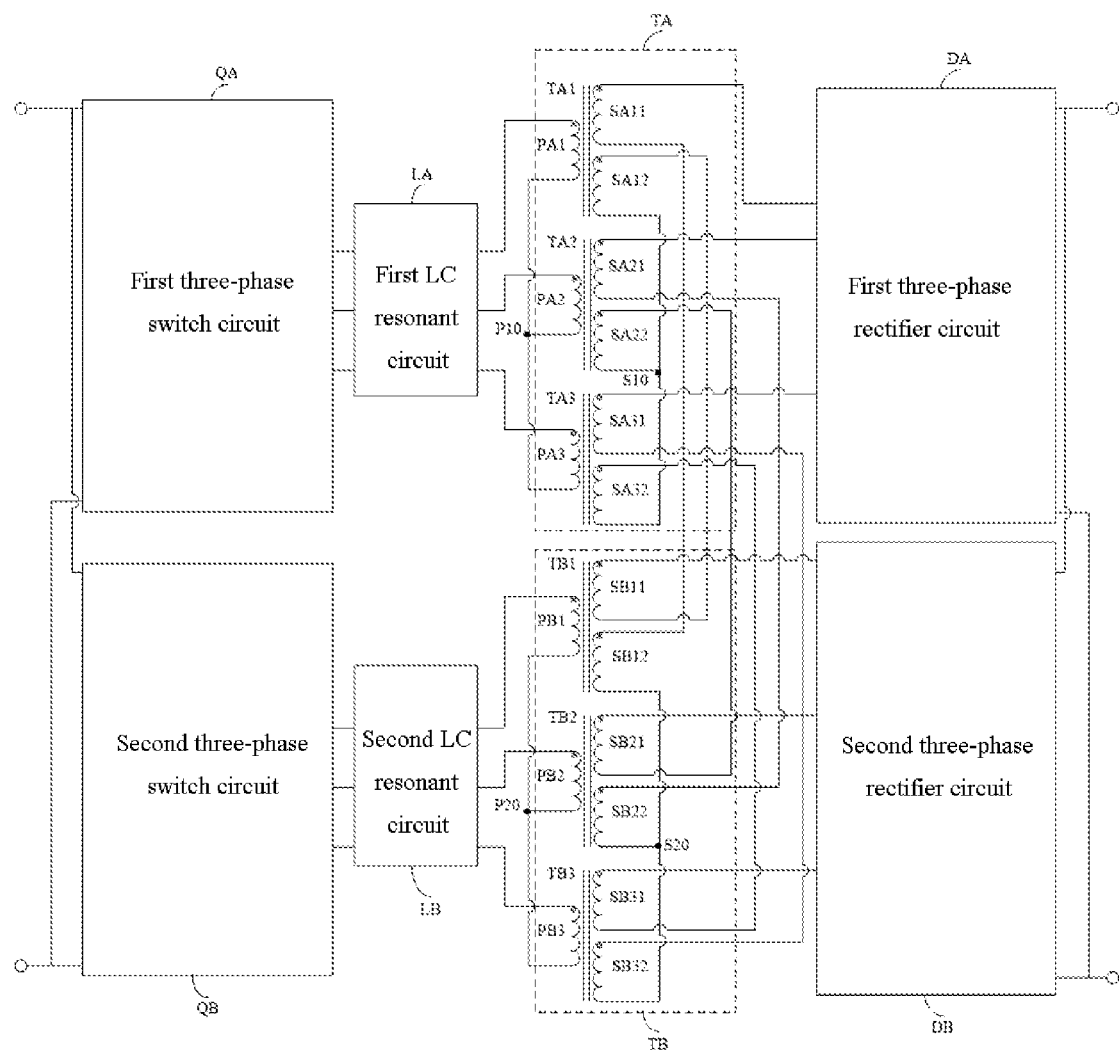
FIG. 3 is a schematic structural diagram of an embodiment of a two-branch three-phase LLC resonant converter system according to the present disclosure.

FIG. 3 is a schematic structural diagram of an embodiment of a two-branch three-phase LLC resonant converter system according to the present disclosure. As shown in FIG. 3, the two-branch three-phase LLC resonant converter system provided in the present disclosure may include: a first resonant circuit and a second resonant circuit.

The first resonant circuit includes a first three-phase switch circuit QA, a first LC resonant circuit LA, a first transformer circuit TA, and a first three-phase rectifier circuit DA.

The second resonant circuit includes a second three-phase switch circuit QB, a second LC resonant circuit LB, a second transformer circuit TB, and a second three-phase rectifier circuit DB.

The first transformer circuit TA includes a first transformer TA1 including one primary side winding PA1 and two secondary side windings SA11 and SA12, a second transformer TA2 including one primary side winding PA2 and two secondary side windings SA21 and SA22, and a third transformer TA3 including one primary side winding PA3 and two secondary side windings SA31 and SA32; the second transformer circuit TB includes a fourth transformer TB1 including one primary side winding PB1 and two secondary side windings SB11 and SB12, a fifth transformer TB2 including one primary side winding PB2 and two secondary side windings SB21 and SB22, and a sixth transformer TB3 including one primary side winding PB3 and two secondary side windings SB31 and SB32, both the primary side windings in the first transformer circuit TA and the second transformer circuit TB have the same number of turns, and all the secondary side windings in the first transformer circuit TA and the second transformer circuit TB have the same number of turns.

A first input of the first LC resonant circuit LA is connected to a first output of the first three-phase switch circuit QA, a second input of the first LC resonant circuit LA is connected to a second output of the first three-phase switch circuit QA, and a third input of the first LC resonant circuit LA is connected to a third output of the first three-phase switch circuit QA, a first output, a second output, and a third output of the first LC resonant circuit are respectively connected to one end of the primary side winding PA1 of the first transformer TA1, one end of the primary side winding PA2 of the second transformer TA2, and one end of the primary side winding PA3 of the third transformer TA3, the other end of the primary side winding PA1 of the first transformer TA1 in the first transformer circuit TA, the other end of the primary side winding PA2 of the second transformer TA2 in the first transformer circuit TA, and the other end of the primary side winding PA3 of the third transformer TA3 in the first transformer circuit TA are connected at a node P10, one secondary side winding SA11 of the first transformer TA1 and one secondary side winding SB12 of the fourth transformer TB1 are connected in series between a first input of the first three-phase rectifier circuit DA and a first common end S20, one secondary side winding SA21 of the second transformer TA2 and one secondary side winding SB22 of the fifth transformer TB2 are connected in series between a second input of the first three-phase rectifier circuit DA and the first common end S20, and one secondary side winding SA31 of the third transformer TA3 and one secondary side winding SB32 of the sixth transformer TB3 are connected in series between a third input of the first three-phase rectifier circuit DA and the first common end S20.

A first input of the second LC resonant circuit LB is connected to a first output of the second three-phase switch circuit QB, a second input of the second LC resonant circuit LB is connected to a second output of the second three-phase switch circuit QB, and a third input of the second LC resonant circuit LB is connected to a third output of the second three-phase switch circuit QB, a first output, a second output, and a third output of the second LC resonant circuit LB are respectively connected to one end of the primary side winding PB1 of the fourth transformer TB1, one end of the primary side winding PB2 of the fifth transformer TB2, and one end of the primary side winding PB3 of the sixth transformer TB3, the other end of the primary side winding PB1 of the fourth transformer TB1, the other end of the primary side winding PB2 of the fifth transformer TB2, and the other end of the primary side winding PB3 of the sixth transformer TB3 are connected at a node P20, the other secondary side winding SA12 of the first transformer TA1 and the other secondary side winding SB11 of the fourth transformer TB1 are connected in series between a first input of the second three-phase rectifier circuit DB and a second common end S10, the other secondary side winding SA22 of the second transformer TA2 and the other secondary side winding SB21 of the fifth transformer TB2 are connected in series between a second input of the second three-phase rectifier circuit DB and the second common end S10, and the other secondary side winding SA32 of the third transformer TA3 and the other secondary side winding SB31 of the sixth transformer TB3 are connected in series between a third input of the second three-phase rectifier circuit DB and the second common end S10.

In an embodiment, an output of the first three-phase rectifier circuit DA may be connected in parallel with an output of the second three-phase rectifier circuit DB; or the output of the first three-phase rectifier circuit DA is connected in series with the output of the second three-phase rectifier circuit DB.

In an embodiment, a current flowing through the primary side windings of the first transformer circuit TA is equal to a current flowing through the primary side windings of the second transformer circuit TB.

In an embodiment, an output voltage of the first three-phase rectifier circuit DA is equal to an output voltage of the second three-phase rectifier circuit DB.

In an embodiment, an input of the first three-phase switch circuit QA is connected in parallel with an input of the second three-phase switch circuit QB.

In an embodiment, the first three-phase switch circuit QA includes three bridge arms connected in parallel with each other, each of the bridge arms includes an upper bridge arm switch and a lower bridge arm switch, common node between the upper bridge arm switches and the lower bridge arm switches of the three bridge arms respectively form the first output, the second output, and the third output of the first three-phase switch circuit; and the second three-phase switch circuit includes three bridge arms connected in parallel with each other, each of the bridge arms includes an upper bridge arm switch and a lower bridge arm switch, common node between the upper bridge arm switches and the lower bridge arm switches of the three bridge arms respectively form the first output, the second output, and the third output of the second three-phase switch circuit.

In an embodiment, each of the first three-phase rectifier circuit and the second three-phase rectifier circuit is a three-phase rectifier bridge.

In an embodiment, a duty cycle of drive signals of the upper bridge arm switch and the lower bridge arm switch of each of the bridge arms is less than 50%, and a phase difference between a drive signal of the upper bridge arm switch and a drive signal of the lower bridge arm switch of each of the bridge arms is 180°.

In an embodiment, drive signals of the upper bridge arm switches of the three bridge arms have a phase-shifted angle with 120°.

In an embodiment, the first three-phase switch circuit QA and the second three-phase switch circuit QB operate synchronously.

Description is made by taking an example where an output of the first three-phase rectifier circuit DA is connected in parallel with an output of the second three-phase rectifier circuit DB for providing a high current, which is shown in FIG. 3, the principle of the current equilibrium of the two-branch three-phase LLC resonant converter system provided in this embodiment lies in that: currents through the secondary windings of the transformer TA1 and TB1 connected in series are the same, then the currents reflected from the secondary side windings to the primary side windings are also eventually equal. Details are as follows:

a branch current of the primary side winding PA1 of the first transformer TA1 is marked as $I_{PA1}$, a branch current of the secondary side winding SA11 of the first transformer TA1 is marked as $I_{SA11}$, and a branch current of the secondary side winding SA12 of the first transformer TA1 is marked as $I_{SA12}$; a branch current of the primary side winding PA2 of the second transformer TA2 is marked as $I_{PA2}$, a branch current of the secondary side winding SA21 of the second transformer TA2 is marked as $I_{SA21}$, and a branch current of the secondary side winding SA22 of the second transformer TA2 is marked as $I_{SA22}$; a branch current of the primary side winding PA3 of the third transformer TA3 is marked as $I_{PA3}$, a branch current of the secondary side winding SA31 of the third transformer TA3 is marked as $I_{SA31}$, and a branch current of the secondary side winding SA32 of the third transformer TA3 is marked as $I_{SA32}$.

A branch current of the primary side winding PB1 of the fourth transformer TB1 is marked as $I_{PB1}$, a branch current of the secondary side winding SB11 of the fourth transformer TB1 is marked as $I_{SB11}$, and a branch current of the secondary side winding SB12 of the fourth transformer TB1 is marked as $I_{SB12}$; a branch current of the primary side winding PB2 of the fifth transformer TB2 is marked as $I_{PB2}$, a branch current of the secondary side winding SB21 of the fifth transformer TB2 is marked as $I_{SB21}$, and a branch current of the secondary side winding SB22 of the fifth transformer TB2 is marked as $I_{SB22}$; a branch current of the primary side winding PB3 of the sixth transformer TB3 is marked as $I_{PB3}$, a branch current of the secondary side winding SB31 of the sixth transformer TB3 is marked as $I_{SB31}$, and a branch current of the secondary side winding SB32 of the sixth transformer TB3 is marked as $I_{SB32}$.

Since the secondary side winding SA11 and the secondary side winding SB12 are connected in series, $I_{SA11}=I_{SB12}$; since the secondary side winding SA12 and the secondary side winding SB11 are connected in series, $I_{SA12}=I_{SB11}$; since the secondary side winding SA21 and the secondary side winding SB22 are connected in series, $I_{SA21}=I_{SB22}$; since the secondary side winding SA22 and the secondary side winding SB21 are connected in series, $I_{SA22}=I_{SB21}$; since the secondary side winding SA31 and the secondary side winding SB32 are connected in series, $I_{SA31}=I_{SB32}$; since the secondary side winding SA32 and the secondary side winding SB31 are connected in series, $I_{SA32}=I_{SB31}$. Since a ratio of the number of turns of the primary side winding and the number of turns of the two secondary side windings of each transformer is 1:N:N, then $I_{PA1}=N*I_{SA11}+N*I_{SA12}$ and $I_{PB1}=N*I_{SB11}+N*I_{SB12}$. $I_{SA11}=I_{SB12}$ and $I_{SA12}=I_{SB11}$, thus $I_{PA1}=N*I_{SA11}+N*I_{SA12}=N*I_{SB11}+N*I_{SB12}=I_{PB1}$. Similarly, $I_{PA2}=I_{PB2}$ and $I_{PA3}=I_{PB3}$. In summary, it can be seen that current equilibrium between the first resonant circuit and the second resonant circuit can be achieved regardless of whether the secondary side windings have the same circuit impedance.

Similarly, if in a case where an output of the first three-phase rectifier circuit DA is connected in series with an output of the second three-phase rectifier circuit DB for providing a high voltage, the principle of the voltage equilibrium of the two-branch three-phase LLC resonant converter system provided in this embodiment lies in that:

a voltage at both ends of the primary side winding PA1 of the first transformer TA1 is marked as $V_{PA1}$, a voltage at both ends of the secondary side winding SA11 of the first transformer TA1 is marked as $V_{SA11}$, and a voltage at both ends of the secondary side winding SA12 of the first transformer TA1 is marked as $V_{SA12}$; a voltage at both ends of the primary side winding PA2 of the second transformer TA2 is marked as $V_{PA2}$, a voltage at both ends of the secondary side winding SA21 of the second transformer TA2 is marked as $V_{SA21}$, and a voltage at both ends of the secondary side winding SA22 of the second transformer TA2 is marked as $V_{SA22}$; a voltage at both ends of the primary side winding PA3 of the third transformer TA3 is marked as $V_{PA3}$, a voltage at both ends of the secondary side winding SA31 of the third transformer TA3 is marked as $V_{SA31}$, and a voltage at both ends of the secondary side winding SA32 of the third transformer TA3 is marked as $V_{SA32}$.

A voltage at both ends of the primary side winding PB1 of the fourth transformer TB1 is marked as $V_{PB1}$, a voltage at both ends of the secondary side winding SB11 of the fourth transformer TB1 is marked as $V_{SB11}$, and a voltage at both ends of the secondary side winding SB12 of the fourth transformer TB1 is marked as $V_{SB12}$; a voltage at both ends of the primary side winding PB2 of the fifth transformer TB2 is marked as $V_{PB2}$, a voltage at both ends of the secondary side winding SB21 of the fifth transformer TB2 is marked as $V_{SB21}$, and a voltage at both ends of the secondary side winding SB22 of the fifth transformer TB2 is marked as $V_{SB22}$; a voltage at both ends of the primary side winding PB3 of the sixth transformer TB3 is marked as $V_{PB3}$, a voltage at both ends of the secondary side winding SB31 of the sixth transformer TB3 is marked as $V_{SB31}$, and a voltage at both ends of the secondary side winding SB32 of the sixth transformer TB3 is marked as $V_{SB32}$.

An output voltage of the first three-phase rectifier circuit DA is marked as $V_{COUT1}$, and an output voltage of the second three-phase rectifier circuit DB is marked as $V_{COUT2}$.

$V_{SA11}=V_{SA12}=N^*V_{PA1}$, $V_{SA21}=V_{SA22}=N^*V_{PA2}$,
$V_{SA31}=V_{SA32}=N^*V_{PA3}$, $V_{SB11}=V_{SB12}=N^*V_{PB1}$,
$V_{SB21}=V_{SB22}=N^*V_{PB2}$, $V_{SB31}=V_{SB32}=N^*V_{PB3}$,
$V_{PA1}=V_{PA2}=V_{PA3}$, and $V_{PB1}=V_{PB2}=V_{PB3}$, thus
$V_{SA11}=V_{SA12}=V_{SA21}=V_{SA22}=V_{SA31}=V_{SA32}=V_A$ and
$V_{SB11}=V_{SB12}=V_{SB21}=V_{SB22}=V_{SB31}=V_{SB32}=V_B$.
$V_{COUT1}=V_A+V_B$ and $V_{COUT2}=V_A+V_B$, thus $V_{COUT1}=V_{COUT2}$. In summary, it can be seen that the output voltage of the first three-phase rectifier circuit DA is equal to the output voltage of the second three-phase rectifier circuit DB regardless of whether the primary side winding has the same voltage at both ends, thus achieving voltage equilibrium in the two-branch circuit.

Figure 4:
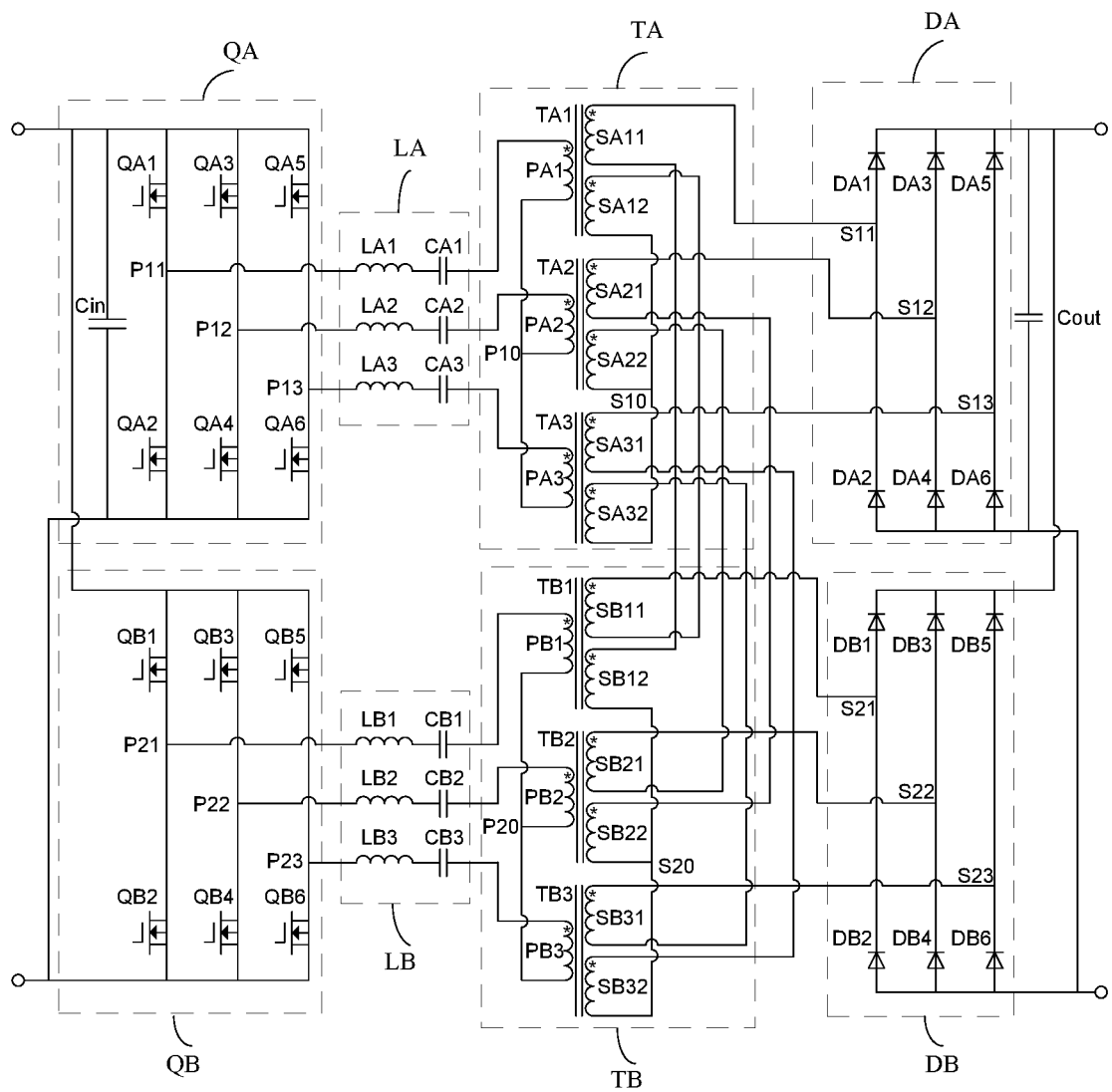
FIG. 4 is a schematic structural diagram of a further embodiment of a two-branch three-phase LLC resonant converter system according to the present disclosure.

FIG. 4 is a schematic structural diagram of a further embodiment of a two-branch three-phase LLC resonant converter system according to the present disclosure. Based on the embodiment of the two-branch three-phase LLC resonant converter system as shown in FIG. 3, the two-branch three-phase LLC resonant converter system provided in this embodiment gives an example of a possible implementation with respect to the first three-phase switch circuit QA, the second three-phase switch circuit QB, the first LC resonant circuit LA, the second LC resonant circuit LB, the first three-phase rectifier circuit DA, and the second three-phase rectifier circuit DB therein. As shown in FIG. 4, the three-phase switch circuits in this embodiment use a full bridge structure, the three-phase rectifier circuit are implemented by using diodes, and an output of the first three-phase rectifier circuit DA is connected in parallel with an output of the second three-phase rectifier circuit DB.

The first three-phase switch circuit 101 includes a first switch transistor QA1, a second switch transistor QA2, a third switch transistor QA3, a fourth switch transistor QA4, a fifth switch transistor QA5, and a sixth switch transistor QA6, where the switch transistor QA1, QA3 and QA5 are upper bridge arm switches, and the switch transistors QA2, QA4 and QA6 are lower bridge arm switches. The switch transistors QA1 and QA2 are connected in series, and a connection point therebetween is the first output of the first three-phase switch circuit QA; the switch transistor QA3 is connected in series with QA4, and a connection point therebetween is the second output of the first three-phase switch circuit QA; the switch transistor QA5 is connected in series with QA6, and a connection point therebetween is the third output of the first three-phase switch circuit QA. The first LC resonant circuit LA includes a first inductor LA1 and a first capacitor CA1 that are connected in series, a second inductor LA2 and a second capacitor CA2 that are connected in series, a third inductor LA3 and a third capacitor CA3 that are connected in series. The first three-phase rectifier circuit DA includes a first diode DA1, a second diode DA2, a third diode DA3, a fourth diode DA4, a fifth diode DA5, and a sixth diode DA6, where DA1 and DA2 are connected in series, and a connection point therebetween is the first input of the first three-phase rectifier circuit DA; DA3 and DA4 are connected in series, and a connection point therebetween is the second input of the first three-phase rectifier circuit DA; DA5 and DA6 are connected in series, and a connection point therebetween is the third input of the first three-phase rectifier circuit DA.

It should be noted that the second three-phase switch circuit QB, the second LC resonant circuit LB, and the second three-phase rectifier circuit DB have a same circuit topology as the first three-phase switch circuit QA, the first LC resonant circuit LA, and the first three-phase rectifier circuit DA, respectively. Reference may be made to FIG. 4, and details will not be described herein again.

Figure 5:
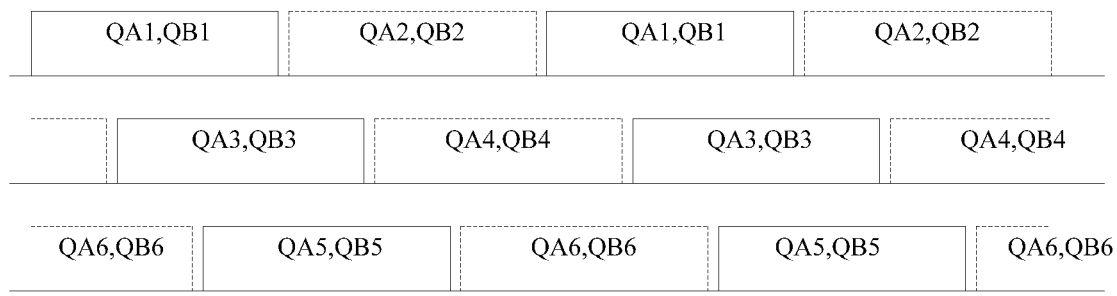
FIG. 5 is a schematic diagram of driving waveforms of switch transistors in a two-branch three-phase LLC resonant converter system according to the present disclosure.

FIG. 5 is a schematic diagram of driving waveforms of switch transistors in a two-branch three-phase LLC resonant converter system according to the present disclosure. As shown in FIG. 5, QA1 and QB1 are driven exactly the same, QA2 and QB2 are driven exactly the same, QA3 and QB3 are driven exactly the same, QA4 and QB4 are driven exactly the same, QA5 and QB5 are driven exactly the same, QA6 and QB6 are driven exactly the same. Driving signals of the switch transistors of the same bridge arm are square waves with a duty cycle of less than 50% and have a phase difference of 180°. For example, driving signals of the switch transistors QA1 and QA2 have a phase difference of 180°. Driving phases of the bridge arms where the switch transistors QA1, QA3 and QA5 are located are different by about 120°, that is, 120° includes an error range of ±5%. Similarly, driving phases of the bridge arms where the switch transistors QB1, QB3 and QB5 are located are also different by about 120°. It should be noted that FIG. 5 only shows one type of the driving waveforms, but the driving waveforms of the two-branch three-phase LLC resonant converter system provided in the embodiments of the present disclosure is not limited thereto.

Figure 6:
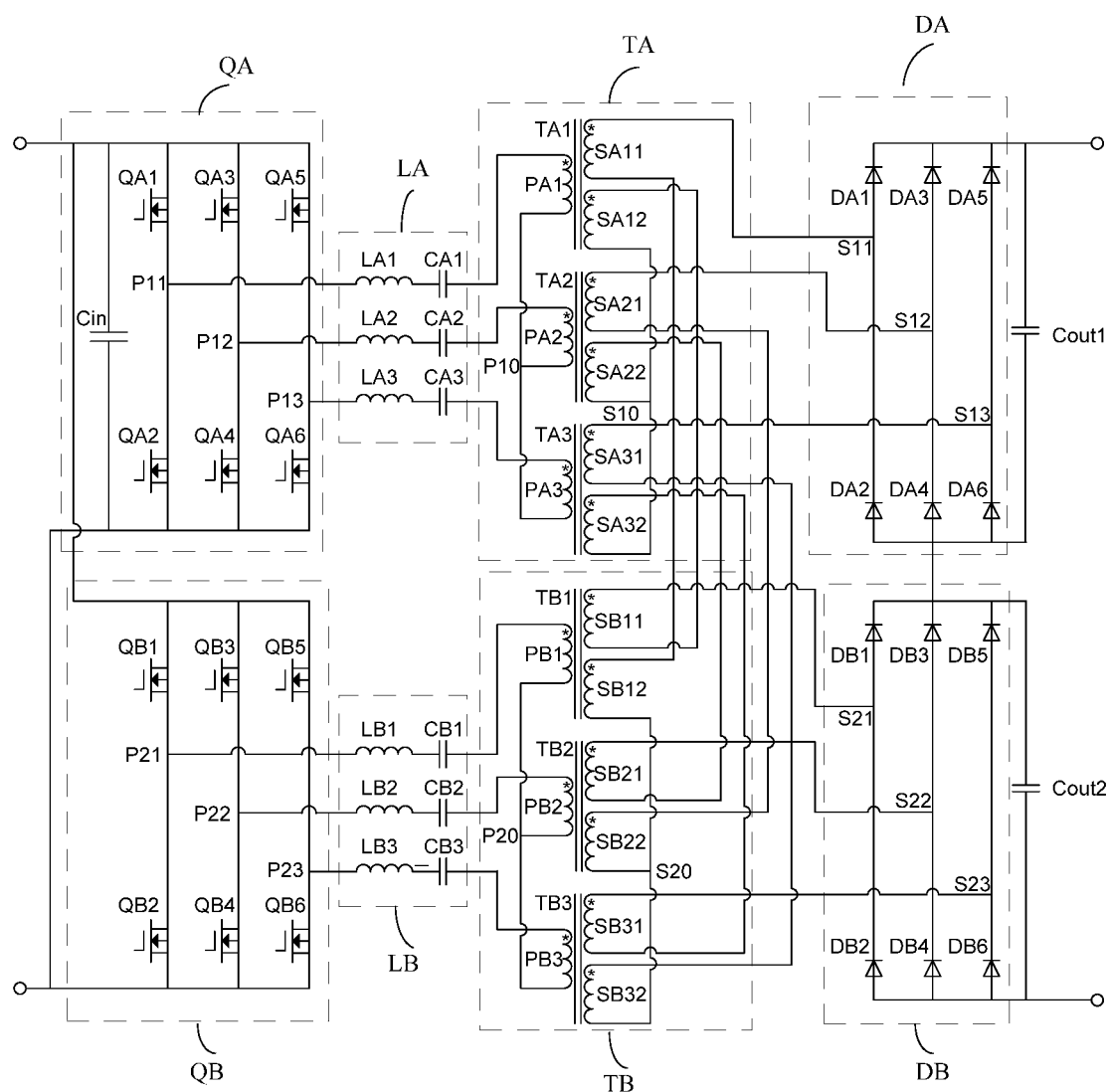
FIG. 6 is a schematic structural diagram of another embodiment of a two-branch three-phase LLC resonant converter system according to the present disclosure.

FIG. 6 is a schematic structural diagram of another embodiment of a two-branch three-phase LLC resonant converter system according to the present disclosure. As shown in FIG. 6, the two-branch three-phase LLC resonant converter system provided in this embodiment connects the output of the first three-phase rectifier circuit DA in series with the output of the second three-phase rectifier circuit DB based on the two-branch three-phase LLC resonant converter system as shown in FIG. 4.

Persons of ordinary skill in the art may understand that, all or a part of the steps of the foregoing method embodiments may be implemented by program instruction related hardware. The foregoing program may be stored in a computer readable storage medium. The program, when run, performs the steps of the foregoing method embodiments. The foregoing storage medium includes various mediums capable of storing program codes, such as a Read-Only Memory (ROM for short), a Random Access Memory (RAM for short), a magnetic disk, or an optical disc.

Finally, it should be noted that the foregoing embodiments are merely intended to describe the technical solutions of the present disclosure rather than limiting the present disclosure. Although the present disclosure has been described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A two-branch three-phase resonant converter system, comprising:
   a first resonant circuit comprising a first three-phase switch circuit, a first LC resonant circuit, a first transformer circuit, and a first three-phase rectifier circuit; and a second resonant circuit comprising a second three-phase switch circuit, a second LC resonant circuit, a second transformer circuit, and a second three-phase rectifier circuit;

wherein the first transformer circuit comprises a first transformer having one primary side winding and two secondary side windings, a second transformer having one primary side winding and two secondary side windings, and a third transformer having one primary side winding and two secondary side windings;

wherein the second transformer circuit comprises a fourth transformer having one primary side winding and two secondary side windings, a fifth transformer having one primary side winding and two secondary side windings, and a sixth transformer having one primary side winding and two secondary side windings, both the primary side windings in the first transformer circuit and the second transformer circuit have the same number of turns, and all the secondary side windings in the first transformer circuit and the second transformer circuit have the same number of turns;

wherein a first input of the first LC resonant circuit is connected to a first output of the first three-phase switch circuit, a second input of the first LC resonant circuit is connected to a second output of the first three-phase switch circuit, and a third input of the first LC resonant circuit is connected to a third output of the first three-phase switch circuit, a first output, a second output, and a third output of the first LC resonant circuit are respectively connected to one end of the primary side winding of the first transformer, one end of the primary side winding of the second transformer, and one end of the primary side winding of the third transformer, the other end of the primary side winding of the first transformer, the other end of the primary side winding of the second transformer, and the other end of the primary side winding of the third transformer are connected, one secondary side winding of the first transformer and one secondary side winding of the fourth transformer are connected in series between a first input of the first three-phase rectifier circuit and a first common end, one secondary side winding of the second transformer and one secondary side winding of the fifth transformer are connected in series between a second input of the first three-phase rectifier circuit and the first common end, and one secondary side winding of the third transformer and one secondary side winding of the sixth transformer are connected in series between a third input of the first three-phase rectifier circuit and the first common end;

wherein a first input of the second LC resonant circuit is connected to a first output of the second three-phase switch circuit, a second input of the second LC resonant circuit is connected to a second output of the second three-phase switch circuit, and a third input of the second LC resonant circuit is connected to a third output of the second three-phase switch circuit, a first output, a second output, and a third output of the second LC resonant circuit are respectively connected to one end of the primary side winding of the fourth transformer, one end of the primary side winding of the fifth transformer, and one end of the primary side winding of the sixth transformer, the other end of the primary side winding of the fourth transformer, the other end of the primary side winding of the fifth transformer, and the other end of the primary side winding of the sixth transformer are connected, the other secondary side winding of the first transformer and the other secondary side winding of the fourth transformer are connected in series between a first input of the second three-phase rectifier circuit and a second common end, the other secondary side winding of the second transformer and the other secondary side winding of the fifth transformer are connected in series between a second input of the second three-phase rectifier circuit and the second common end, and the other secondary side winding of the third transformer and the other secondary side winding of the sixth transformer are connected in series between a third input of the second three-phase rectifier circuit and the second common end.

2. The system according to claim 1, wherein an output of the first three-phase rectifier circuit is connected in parallel with an output of the second three-phase rectifier circuit.

3. The system according to claim 1, wherein an output of the first three-phase rectifier circuit is connected in series with an output of the second three-phase rectifier circuit.

4. The system according to claim 2, wherein a current flowing through the primary side windings of the first transformer circuit is equal to a current flowing through the primary side windings of the second transformer circuit.

5. The system according to claim 3, wherein an output voltage of the first three-phase rectifier circuit is equal to an output voltage of the second three-phase rectifier circuit.

6. The system according to claim 1, wherein an input of the first three-phase switch circuit is connected in parallel with an input of the second three-phase switch circuit.

7. The system according to claim 1, wherein the first three-phase switch circuit comprises three bridge arms connected in parallel with each other, each of the bridge arms comprises an upper bridge arm switch and a lower bridge arm switch, common node between the upper bridge arm switches and the lower bridge arm switches of each of the three bridge arms respectively form the first output, the second output, and the third output of the first three-phase switch circuit; and the second three-phase switch circuit comprises three bridge arms connected in parallel with each other, each of the bridge arms comprises an upper bridge arm switch and a lower bridge arm switch, common node between the upper bridge arm switches and the lower bridge arm switches each of the three bridge arms respectively form the first output, the second output, and the third output of the second three-phase switch circuit.

8. The system according to claim 1, wherein each of the first three-phase rectifier circuit and the second three-phase rectifier circuit is a three-phase rectifier bridge.

9. The system according to claim 7, wherein a duty cycle of drive signals of the upper bridge arm switch and the lower bridge arm switch of each of the bridge arms is less than 50%, and a phase difference between a drive signal of the upper bridge arm switch and a drive signal of the lower bridge arm switch of each of the bridge arms is 180°.

10. The system according to claim 7, wherein drive signals of the three upper bridge arm switches have a phase-shifted angle with 120°.

11. The system according to claim 7, wherein the first three-phase switch circuit and the second three-phase switch circuit operate synchronously.

* * * * *